United States Patent

Shafranovsky et al.

[11] 4,038,353
[45] July 26, 1977

[54] ROTOR FILM COLUMN FOR MAKING CONTACT BETWEEN GAS AND LIQUID

[76] Inventors: Alexandr Vladimirovich Shafranovsky, Molodezhnaya ulitsa, 4, kv. 7, Moskovskaya oblast, Balashikha; Viktor Markovich Olevsky, Leningradsky prospekt, 75a, kv. 91, Moscow; Vladimir Kazimirovich Chubukov, Komsomolsky prospekt, 41, kv. 97, Moscow; Jury Alexandrovich Baskov, Shosse Entuziastov, 156, kv. 20, Moscow, all of U.S.S.R.

[21] Appl. No.: 713,278

[22] Filed: Aug. 11, 1976

[51] Int. Cl.² .................................. B01D 47/16
[52] U.S. Cl. ............................................ 261/89
[58] Field of Search .................. 261/84, 88, 89, 112

[56] References Cited

U.S. PATENT DOCUMENTS

| | | | |
|---|---|---|---|
| 1,650,140 | 11/1927 | Kuhni | 261/112 |
| 1,776,644 | 9/1930 | Vreeland | 261/89 |
| 1,936,523 | 11/1933 | Placek | 261/88 |
| 2,007,759 | 7/1935 | Harmon | 261/89 |
| 2,317,951 | 4/1943 | Burk | 261/112 |
| 2,404,789 | 7/1946 | Burk et al. | 261/112 |
| 3,151,043 | 9/1964 | Beattie et al. | 261/89 |
| 3,261,595 | 7/1966 | Trobeck | 261/84 |
| 3,369,800 | 2/1968 | Takamatsu et al. | 261/88 |
| 3,758,085 | 9/1973 | Mentschel | 261/89 |

FOREIGN PATENT DOCUMENTS

| | | | |
|---|---|---|---|
| 204,014 | 6/1959 | Austria | 261/84 |
| 2,092,621 | 1/1972 | France | 261/89 |
| 7,536 | 3/1911 | United Kingdom | 261/89 |
| 10,552 | 5/1905 | United Kingdom | 261/84 |
| 16,726 | 8/1893 | United Kingdom | 261/89 |
| 859,097 | 1/1961 | United Kingdom | 261/89 |

Primary Examiner—Tim R. Miles
Assistant Examiner—Gregory N. Clements

[57] ABSTRACT

A rotor film column comprises a housing accommodating a shaft which carries contact stages mounted on said shaft at a certain distance one above another and formed by bands shaped as spirals diverging from the shaft, the edges of said bands being flanged towards the shaft. The bands are provided with essentially transverse corrugations.

9 Claims, 9 Drawing Figures

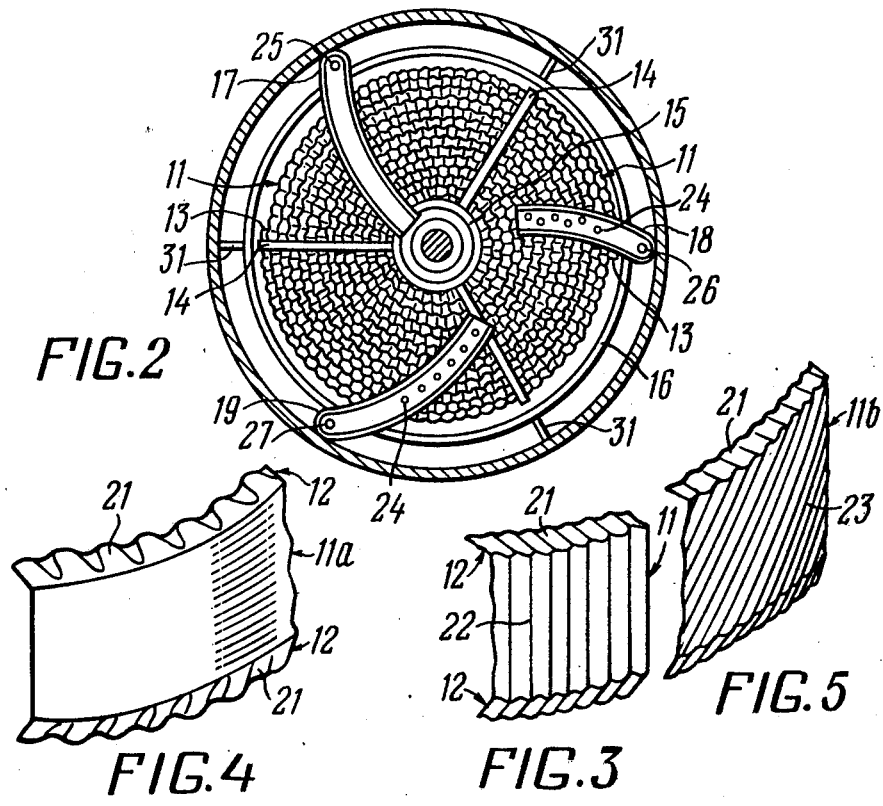

U.S. Patent    July 26, 1977    Sheet 3 of 3    4,038,353
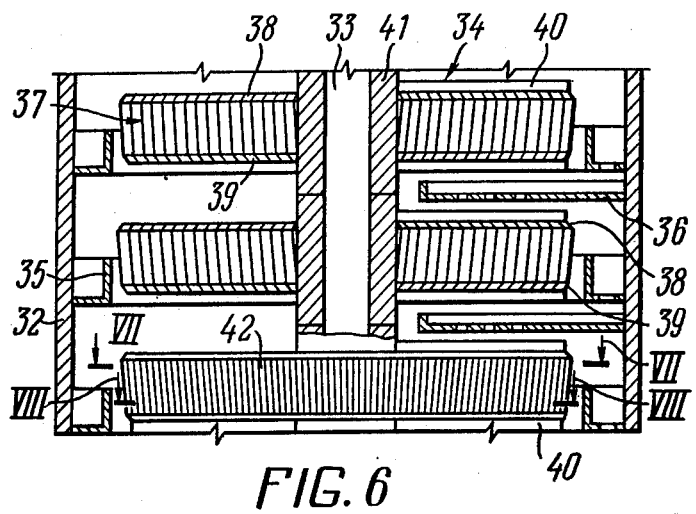
FIG. 6
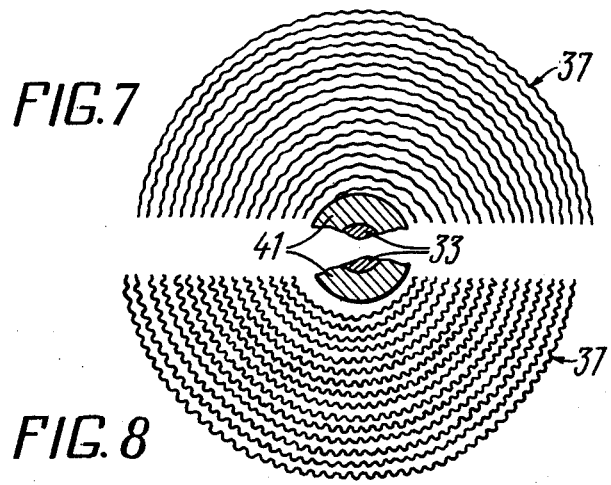
FIG. 7
FIG. 8
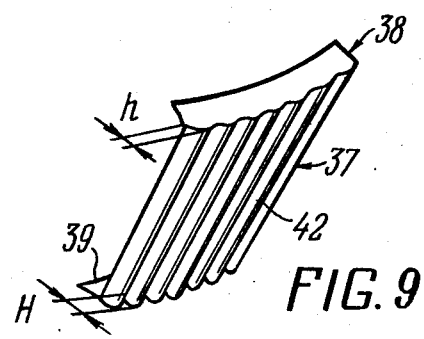
FIG. 9

ROTOR FILM COLUMN FOR MAKING CONTACT BETWEEN GAS AND LIQUID

The present invention relates to equipment for conducting mass-transfer processes, and, more particularly, to a rotor film column for making contact between a gas (vapour) and a liquid. The invention is preferably employed in the field of vacuum rectification of substances sensitive to elevated temperatures, such as lactams, fatty acids, polyatomic alcohols, ethanol amines, high-boiling esters, various oils, foodstuffs, pharmaceuticals. The proposed invention may be used in chemical industry, oil refining, food industry, pharmaceutical industry, etc.

Known in the art is a rotor film column for making contact between a gas and a liquid, comprising a housing with branch pipes for feeding the gas into the lower part of the column, for removing said gas from the upper part of the column, for feeding the liquid into the column and for removing it from the column; and a vertical shaft rotatably mounted in said housing. Mounted on the shaft are several contact stages located at a certain distance from one another. The contact stages are formed by bands bent as flat spiral members diverging from the shaft. The bands are flanged at their edges towards the shaft. The rotor film column is also provided with means for transferring the liquid from one contact stage to another. These means include annular pockets secured on the inner side wall of the housing and used for receiving the liquid discharged from the contact stages; and overflow trays. The overflow trays occupy the space between the contact stages. The receiving ends of the trays communicate with the annular pockets for collecting the liquid pouring from the overlying stages. The pouring ends of the trays are located above the underlying contact stages.

During the operation of the rotor film column, its shaft is rotated. The gas is admitted into the lower part of the column and is withdrawn from the upper part of the column through the branch pipes. The liquid moves in the column downwards flowing from one contact stage to another by gravity. All contact stages of the column rotate together with the shaft; therefore, the liquid which is on the contact stage and acted up on by centrifugal forces flows in the form of a film along the inner surface of the bands, i.e. along the band surface facing the shaft. Since the edges of the bands are flanged towards the shaft, the liquid does not drop down from the bands but moves from the centre to the periphery of the contact stage along a spiral path. From the periphery of the contact stage, the liquid is thrown to the walls of the column housing, then flows by gravity into the annular pockets. From this pocket, the liquid flows by gravity into the receiving end of the underlying tray whose discharge end is disposed above the next contact stage. The liquid flows from the tray onto this stage and its motion is identical to that on the overlying contact stage. The liquid thrown from the lowest contact stage of the column is drained through the branch pipe in the lower part of the column. The gas moving upwards passes through the contact stages coming into contact with the film of liquid wetting the inner side of the flanged spirally bent bands.

A disadvantage of the known rotor film column for making contact between a gas and a liquid is the limited surface of contact between the gas and liquid. The surface of contact in the column is restricted to the total working surface of the contact stages. The working surface of the contact stage is only the inner side of the flanged spiral bands, i.e. the side facing the shaft and covered with the moving liquid film.

Furthermore, the liquid film irrigating the inner side of the spiral bands is insufficiently agitated during its motion along a spiral path from the centre to the periphery of the contact stage. This is due to the fact that the liquid film rotates together with the contact stage and, in this case, the energy of rotation of the contact stage is not used for additional agitation of the film. The rotation of the contact stage provides only for the formation of a liquid film on the wetted surface of the bands and motion of the film to the periphery of the apparatus under the effect of centrifugal forces.

A limited surface of contact between the gas and liquid and insufficient agitation of the liquid film in the process of contact restrict further increase in the efficiency of the mass transfer in the known rotor film column.

An object of the present invention is to provide a rotor film column for making contact between a gas and a liquid having a developed contact surface and means for additional agitation of the liquid film. This makes it possible to additionally intensify the mass exchange process in the column.

This object is attained by providing a rotor film column for making contact between a gas and a liquid, comprising a housing with branch pipes for feeding the gas into the bottom part of the housing, for removing the gas from the top part of the housing, for delivering the liquid into the housing and for removing it therefrom; a vertical shaft rotatably mounted in said housing, a plurality of contact stages secured on the shaft one above another and at a certain distance therebetween, said stages being formed by bands shaped in the form of spirals diverging from the shaft and having flanged edges directed towards the shaft; means for transferring the liquid from one contact stage to another, said means being made in the form of annular pockets secured on the inner side wall of the housing and used for collecting the liquid flowing from the contact stages; overflow trays arranged in the space between the contact stages, the receiving ends of said trays communicating with the annular pockets for collecting the liquid flowing from the contact stages and the discharge ends being located above the underlying contact stages; according to the invention, the bands are provided with substantially transverse corrugations.

In such a rotor film column, the surface of contact between the gas and liquid is additionally increased due to fractionation and atomization of the liquid where it falls on the spiral bands provided with transverse corrugations. The effect of fractionation and atomization of the liquid is ensured by its being thrown onto the corrugated band rotating together with the contact stage from a stationary overflow tray. At the moment of contact of the stream of liquid with the corrugations of the band, the velocity of a respective section of the band with respect to the stream is equal in magnitude to the absolute linear velocity of this section rotating together with the contact stage. The spiral shape of the bands results in a tangential impact of the stream of liquid against the corrugated bands. In this case, the liquid is in contact both with external and internal surfaces of the bands. The resulting sprays of liquid then precipitate on the inner surface of the bands under the action of centrifugal forces and cause additional agitation, i.e. mixing of the liquid film having already covered the inner side of the bands.

An increase in the surface of contact between the gas and the liquid due to spraying and additional agitation of the liquid film precipitated by the sprays helps to rise the efficiency of the mass transfer and to increase the efficiency of the contact stage, for example, in the process of rectification.

The upper edge of the band should preferably be located at a longer distance from the shaft than the lower edge thereof.

Owing to this the inner surface of the bands is more accessible for the sprays of liquid thrown from the overlying tray and the corrugations take part in spraying the liquid along their entire length.

It is expedient to increase the height of the corrugations along the band width with an increase in the distance from the upper edge of the band. Owing to this, the underlying sections of the corrugations are approximately as accessible for the streams of liquid as the upper sections of the same.

It is also expedient to provide drain orifices in the bottom of the overflow trays. The overflow trays being so designed allows the same amount of liquid to be distributed at many points of the same contact stage. This helps to develop the contact surface and to increase the agitation of the liquid film.

The overflow trays are preferably secured on at least one vertical rod mounted at the side wall of the housing with a possibility of rotation to provide for control of the position of the overflow trays with respect to the contact stages. Such an embodiment of the overflow trays makes it possible to change the point of feeding the liquid on the contact stages without stopping the column. In this case it is possible to find an optimum method of distribution of the liquid on the contact stages, which provides for maximum surface of contact and highest degree of agitation of the liquid film. The most favourable position of the overflow trays above the contact stages can be found empirically, without stopping the column, using, for example, the quality of the column distillate as an optimum criterion.

The invention is further described in greater detail with reference to the accompanying drawings, in which:

FIG. 2 is a sectional view taken along line II—II in FIG. 1;

FIG. 3 is an isometric enlarged view of an element of the band forming a contact stage, according to the invention;

FIG. 4 is an isometric enlarged view of an element of the band in a second embodiment thereof, according to the invention;

FIG. 5 is an isometric enlarged view of an element of the band in a third embodiment thereof, according to the invention;

FIG. 6 is a longitudinal section view of an embodiment of the rotor film column, according to the invention;

FIG. 7 is a sectional view taken along line VII—VII in FIG. 6;

FIG. 8 is a sectional view taken along line VIII—VIII in FIG. 6;

FIG. 9 is an isometric enlarged view of an element of the band forming a contact stage of the column shown in FIG. 6, according to the invention.

Figure 1:
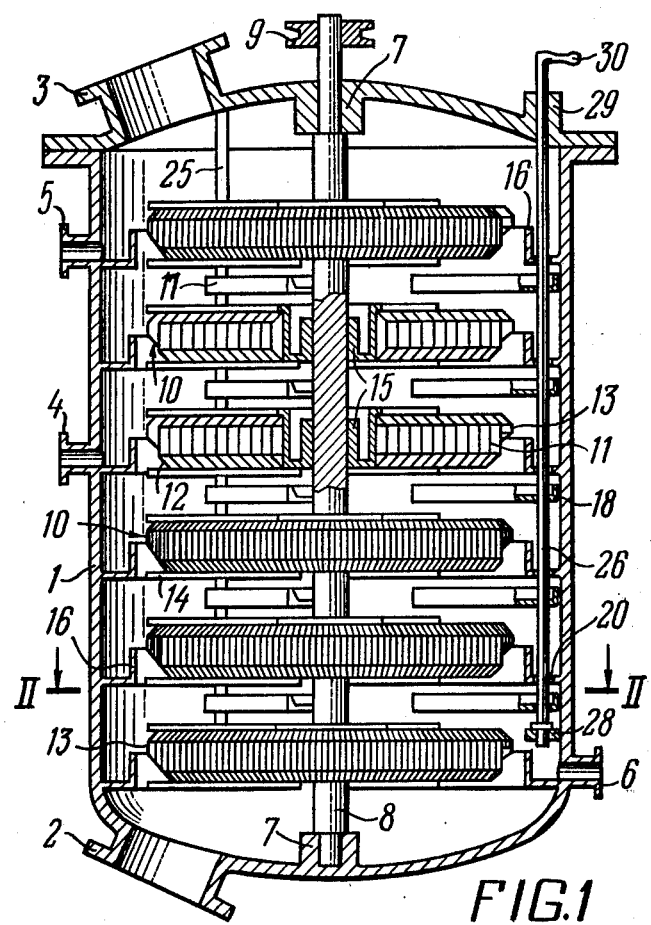
FIG. 1 is a longitudinal section view of a rotor film column according to the invention.

The rotor film column for making contact between a gas and a liquid has a cylindrical housing 1 (FIG. 1) which has a branch pipe 2 for feeding the gas into the bottom part of the column, a branch pipe 3 for removing the gas from the top part of the column, a branch pipe 4 for feeding the liquid into the medium part of the column, a branch pipe 5 for feeding the liquid into the top part of the column, and a branch pipe 6 for removing the liquid from the column. A vertical shaft 8 is mounted coaxially in the housing 1 and can rotate in bearings 7. The upper end of the shaft 8 is provided with a pulley 9 which is rotated by a drive mechanism not shown in the drawing. Contact stages 10 are secured on the shaft 8 at a definite distance one from another. The working surface of each contact stage 10 is formed by two bands 11 (FIGS. 1 and 2). The bands 11 are shaped in the form of spirals diverging from the shaft 8 and flanged towards this shaft, i.e. the edges 12 of the bands 11 are bent in the direction to the shaft 8. Two bands 11 form a double-screw spiral member.

The flanged edges 12 are used for maintaining the liquid on the inner surface of the band 11, i.e. on the surface facing the shaft 8.

The external ends 13 of the bands 11 are narrowed for collecting the liquid film into a stream before throwing it onto the walls of the housing 1.

Radial bars 14 are used for securing the bands 11 on a central hub 15 made in the form of a circular cup.

The hub 15 is used for mounting the contact stage 10 on the shaft 8. The column also includes devices for pouring the liquid from one contact stage 10 to another. These devices include annular pockets 16 secured on the inner wall of the housing 1 and overflow trays 17, 18, 19 (FIG. 2) communicating with the annular pockets 16 and located in the space between the contact stages 10. The annular pockets 16 receive the liquid thrown down from the rotating contact stages 10; therefore, the external ends 13 of the band 11 are located somewhat above the pockets 16, as shown in FIG. 1. The bottoms of the pockets 16 have orifices 20 through which the pockets communicate with the overflow trays 17, 18, 19 (FIG. 2). The latter are used for feeding the liquid from the pockets 16 on the underlying contact stages 10. The same cross-sectional area between the contact stages 10 contains three trays 17, 18, 19, which are curved in plane.

The bands 11 are provided with substantially transverse corrugations 21 and 22 (FIG. 3). The corrugations 21 are made on the flanged edges 12 of the band 11, while the corrugations 22 are made on its irrigated portion, on which a liquid film is usually formed. However, the corrugations 21 can be only on the flanged edges 12, as on the band 11a (FIG. 4) or, like on the band 11b (FIG. 5), the corrugations on the irrigated surface can to some extent be inclined with respect to the edge of the band 11b.

An embodiment of the invention shown in FIG. 1 has contact stages 10, in which the band 11 is made as shown in FIG. 3, although it is possible to use bands 11a (FIG. 4) or bands 11b (FIG. 5).

The band 11a (FIG. 4) is used in cases when it is desirable to minimize the time of residence of the liquid on each contact stage and, therefore, in the whole column. The corrugations 21 made on the edges of the bands 11a do not increase the amount of liquid on the rotating contact stage, i.e. they do not increase the dynamic delay of the contact stage with respect to the liquid. In this case, however, the corrugations perform their functions in promoting spraying and atomization of the liquid thrown down from the overlying trays 17, 18, 19 (FIG. 2).

The bands 11 (FIG. 3) and 11b (FIG. 5) are used where it is necessary to increase the time of residence of the liquid on the contact stage 10. The recesses in the gaps between the corrugations 22 (FIG. 3) or 23 (FIG. 5) at the wetted side of the bands increase the amount of liquid on the band. This, in turn, increases the residence time of the liquid in the column, which can be very useful in some cases, for example, in processes accompanied by a chemical reaction. The corrugations 22 (FIG. 3) together with the corrugations 21 assist in spraying and atomization of the liquid and, therefore, in increasing the contact surface. The bottoms of the trays 18 and 19 (FIG. 2) are provided with orifices 24 for distributing the liquid over the contact stage 10 at any points in order to favour the development of the contact surface and to increase the degree of agitation of the liquid film.

The trays 17 have no orifices in their bottom, since they are used for supplying the liquid only into the annular cups 15 and the liquid must be poured therefrom only at the open end. According to the invention, the sets of trays 17, 18, 19 are mounted at the dead end on common vertical rods 25, 16, 27, respectively, arranged near the wall of the housing 1 of the column in bearings 28 and 29 (FIG. 1) and capable of rotating therein. The rods 25, 26, as well as the rod 27 invisible in FIG. 1, extend through the pockets 16 through openings 20. The place where the rods 25, 26, 27 pass through the bottoms of the trays 17, 18, 19 (FIG. 2) are hermetically sealed. One end of each of the rods 25, 26, 27 is extended outside and provided with rotary handles 30 (FIG. 1). A turn of the handle 30 ensures a required position of the trays 17, 18, 19 (FIG. 2) in the cross-sectional plane of the column. FIG. 2 illustrates one possible embodiment of the disposition of the trays. In particular, either only one or as many as four trays can be arranged in the same cross-sectional area of the column. In order to provide for a more even distribution of the liquid simultaneously over several different trays 17, 18, 19, the annular pockets 16 may be divided into three independent sectors by transverse partitions 31.

In an other embodiment of the rotor film column (FIG. 6), the shape of the bands forming a contact stage is modified. This column has a housing 32 with a vertical shaft 33 and contact stages 34 mounted on the shaft 33. The overflow devices are made in the form of annular pockets 35 and overflow trays arranged above the pockets 35. The contact stages 34 are formed by helically twisted bands 37 (FIGS. 6, 7, 8) whose upper edges 38 (FIG. 6) and lower edges 39 are flanged towards the shaft 33. The bands 37 are secured on radial ribs 40 coupled to a central hub 41. The upper edge 38 of the band 37, according to the invention, is at a greater distance from the shaft 33 than the lower edge 39 of this band. Furthermore, the height of the corrugations 42 (FIG. 9) of the bands 37 is increased from $h$ to $H$ along the width of the bands 37 in the direction from their upper edge 38. Such a design of the contact stage 34 (FIG. 6) assists in penetration of the streams of the liquid flowing from the overlying tray 36 to all the sections of the corrugations 42 made on the irrigated portion of the bands 37.

The rotor film column, when used in the process of rectification, operates as follows. The vapours of the mixture to be separated having a reduced content of a readily volatile component are fed into the column from below through the branch pipe 2 (FIG. 1) and are removed therefrom through the branch pipe 3. The initial liquid mixture of the components to be separated is fed into the column through the branch pipe 4, in which case it is delivered into the annular pocket 16. The reflux residue is fed into the column through the branch pipe 5; the reflux fills the uppermost annular pocket 16 from which it flows downwards along the tray 17 and is delivered to the contact stage 10. The uppermost contact stage 10 is used as a separation stage. It is used for mist elimination. The liquid precipitated on the uppermost contact stage 10 is thrown therefrom into the uppermost annular pocket 16. From the pockets 16 the liquid flows into the trays 17, 18, 19 (FIG. 2) located under these pockets. Then, the liquid is distributed on the underlying contact stages 10. From the trays 17 the liquid is delivered into the annular cups 15. From the trays 18 and 19 the liquid flows through the open ends and the drain orifices 24 and pours directly on the bands 11 of the rotating contact stages 10. In this case, the liquid is sprayed and atomized. The sprays of liquid, while precipitating on the working (irrigated) surface of the bands 11, agitate the liquid film. As a result, the intensity of the mass transfer is increased. From the annular cup 15 the liquid also flows to the bands 11 under the effect of centrifugal forces. From the rotating contact stage 10 the sprays of liquid are thrown down onto the walls of the housing 1 of the column; then the liquid flows into the underlying pocket 16. The vapours of the mixture to be separated come in contact with the liquid film irrigating the bands 11 and also with the mist suspended in the gap between the bands 11.

In the process of operation of the column, the trays can be adjusted in any position by turning the corresponding rods 25, 26, 27. This makes it possible to arrange the trays 17, 18, 19 so as to obtain the maximum contact surface and the degree of agitation of the film on the bands 11 without shutting down the column. In this case the quality of the column distillate can be used as a criterion of optimum operation.

The column shown in FIG. 6 operates in a similar way.

What is claimed is:

1. A rotor film column for making contact between a gas and a liquid comprising in combination; a housing; branch pipes for feeding the gas into the bottom part of said housing and for removing the gas from the top part of said housing; branch pipes for feeding the liquid into said housing and for removing the liquid therefrom; a vertical shaft rotatably mounted in said housing; contact stages secured on said shaft at a certain distance one above another; bands forming said contact stages, said bands being bent in the form of spirals diverging from said shaft; edges of said bands flanged towards said shaft; corrugations on said bands arranged substantially across these bands; annular pockets for collecting the liquid thrown down from said contact stages, said pockets being secured on the inner wall of said housing; overflow trays arranged in the space between said contact stages; receiving ends of said overflow trays communicating with said annular pockets for collecting the liquid flowing from the contact stages located above said overflow trays; discharge ends of said overflow trays located above the contact stages underlying these overflow trays.

2. A rotor film column according to claim 1, in which the upper edge of said band of the contact stage is located at a longer distance from said shaft than its lower edge.

3. A rotor film column according to claim 1, in which the height of said corrugations of the band is increased along the width of this band with an increase in the distance from its upper edge.

4. A rotor film column according to claim 2, in which the height of said corrugations of the band is increased along the width of this band with an increase in the distance from its upper edge.

5. A rotor film column according to claim 1, in which said overflow trays have bottoms provided with drain orifices.

6. A rotor film column according to claim 2, in which said overflow trays have bottoms provided with drain orifices.

7. A rotor film column according to claim 3, in which said overflow trays have bottoms provided with drain orifices.

8. A rotor film column according to claim 1, comprising: at least one vertical rod rotatably mounted in said housing near its side wall, which rod carries said overflow trays so that their position can be controlled across the column with respect to the contact stages.

9. A rotor film column according to claim 5, comprising: at least one vertical rod rotatably mounted in said housing near its side wall, which rod carries said overflow trays so that their position can be controlled across the column with respect to the contact stages.

* * * * *